(12) United States Patent
An

(10) Patent No.: US 12,599,836 B2
(45) Date of Patent: Apr. 14, 2026

(54) DINING GAME APPARATUS

(71) Applicant: Mouth Arcade, Irvine, CA (US)

(72) Inventor: Andrew An, Irvine, CA (US)

( * ) Notice: Subject to any disclaimer, the term of this patent is extended or adjusted under 35 U.S.C. 154(b) by 254 days.

(21) Appl. No.: 18/431,602

(22) Filed: Feb. 2, 2024

(65) Prior Publication Data

US 2025/0249351 A1 Aug. 7, 2025

(51) Int. Cl.

| | |
|---|---|
| A63F 13/214 | (2014.01) |
| A63F 13/211 | (2014.01) |
| A63F 13/215 | (2014.01) |
| A63F 13/285 | (2014.01) |
| A63F 13/54 | (2014.01) |
| A63F 13/80 | (2014.01) |
| A63F 13/235 | (2014.01) |

(52) U.S. Cl.
CPC .......... *A63F 13/214* (2014.09); *A63F 13/211* (2014.09); *A63F 13/215* (2014.09); *A63F 13/285* (2014.09); *A63F 13/54* (2014.09); *A63F 13/80* (2014.09); *A63F 13/235* (2014.09); *A63F 2300/8094* (2013.01)

(58) Field of Classification Search
None
See application file for complete search history.

(56) References Cited

U.S. PATENT DOCUMENTS

| | | | |
|---|---|---|---|
| 10,799,801 B1 | 10/2020 | Wray | |
| 2014/0052275 A1 | 2/2014 | Pathak | |
| 2015/0179086 A1 | 6/2015 | Km et al. | |

| | | | | |
|---|---|---|---|---|
| 2015/0339532 A1* | 11/2015 | Sharma | ................. | G06F 1/1686 |
| | | | | 345/633 |

(Continued)

FOREIGN PATENT DOCUMENTS

| | | |
|---|---|---|
| CN | 212261068 U | 1/2021 |
| KR | 20170022677 A | 3/2017 |
| KR | 20210054203 A | 5/2021 |

OTHER PUBLICATIONS

Kadomura et. al; Title: Sensing Fork and Persuasive Game for Improving Eating Behavior; Dated: Sep. 2013 Website: chrome-extension://efaidnbmnnnibpcajpcglclefindmkaj/https://mobiquitous.com/pub/ubicomp2013-sensingfork.pdf.

(Continued)

*Primary Examiner* — Jason T Yen
(74) *Attorney, Agent, or Firm* — Briggs IP; Jeremy A. Briggs

(57) ABSTRACT

A dining game apparatus is disclosed. The apparatus may include a holding unit configured to hold a food item or a beverage. The apparatus may further include a sensor unit electrically coupled with the holding unit. The sensor unit may be configured to output a first signal when a user mouth touches the holding unit. The apparatus may further include an actuator configured to output a second signal when the actuator may be activated. The apparatus may additionally include a transceiver communicatively coupled with the sensor unit and the actuator. The transceiver may be configured to transmit one or both of the first signal and the second signal to an external computing device. The first signal alone may cause the external computing device to perform a first action, and the first signal and the second signal together may cause the external computing device to perform a second action.

20 Claims, 9 Drawing Sheets

(56)     References Cited

U.S. PATENT DOCUMENTS

2016/0136516 A1*  5/2016  Hooke ................. A63F 13/428
                                          463/31
2021/0031110 A1*  2/2021  Bradley ............... G06F 3/0346

OTHER PUBLICATIONS

Brand: Digital Spoon; Title: Digital Spoon Scale Electronic Measuring Spoon for Food, Spice High Precision with LCD Display Weights up to 500g (USB Charging); Dated: Nov. 14, 2023 Website: https://www.amazon.com/Digital-Electronic-Measuring-Precision-Charging/dp/B0B5KMP2XT.

\* cited by examiner

DINING GAME APPARATUS

TECHNICAL FIELD

The present disclosure relates generally to a dining game apparatus and more particularly to a dining game apparatus that enables control of a gaming device communicatively coupled with the dining game apparatus.

BACKGROUND

It is known that healthy, balanced and nutritious diet benefits children by augmenting their growth. Such diet also helps adults in maintaining well-being and a healthy lifestyle. However, many children and adults do not follow the habit of consuming nutritious diet regularly, which may have long term health effects. Further, inculcating such habits in users is not easy. Although multiple sources of information, e.g., literature, online videos, etc. are available that teach the benefits of nutritious diet; however, still, many users do not follow the practice of consuming nutritious diet regularly.

Therefore, a system is required that may encourage children and adults to consume healthy food and beverages, and make dining experience more entertaining and enriching.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
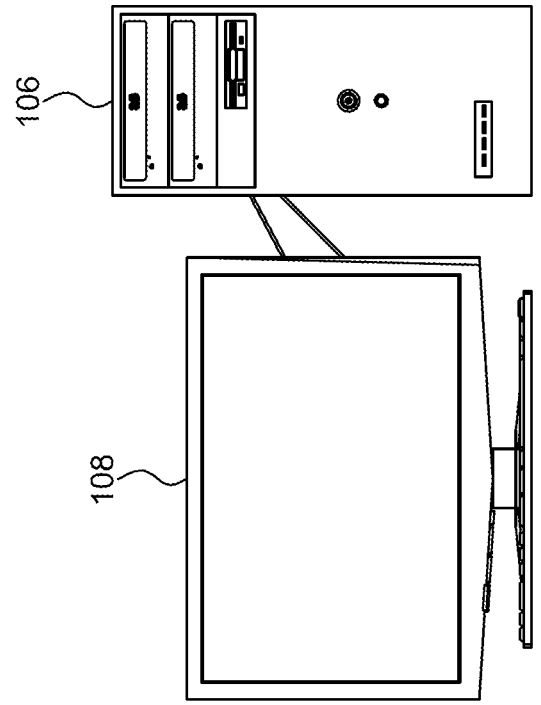
FIG. 1 depicts an example environment in which techniques and structures for providing the systems and methods disclosed herein may be implemented.
Figure 1:
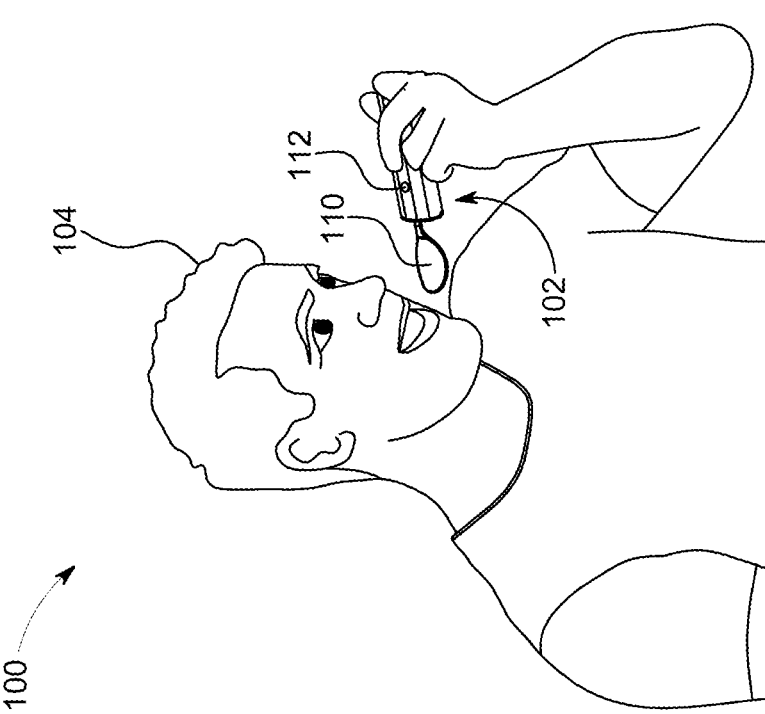

The present disclosure describes a dining game apparatus ("apparatus") that may make a user's dining experience more immersive and entertaining, and assist in inculcating good and healthy food habits in the user. The apparatus may include a holding unit (e.g., a spoon) that may be configured to hold a food item (e.g., a healthy food item). The apparatus may further include a sensor unit (e.g., a capacitive sensor) that may be configured to output a signal (e.g., a first signal) when the user's mouth touches the spoon and eats the food item from the spoon. The apparatus may be communicatively coupled with an external computing device, which in turn may be connected with a display screen. The computing device may be configured to receive the first signal from the apparatus, and render and control a virtual gaming environment on the display screen in a first manner, responsive to receiving the first signal. For example, the computing device may cause a character (e.g., a cartoon or virtual character) in the virtual gaming environment being displayed on the display screen to gain in strength or size, responsive to receiving the first signal. Since the computing device receives the first signal when the user eats the food item from the spoon, causing the virtual character to gain in strength or size responsive to receiving the first signal may encourage the user to eat more from the spoon, thereby inculcating healthy food habits in the user.

In some aspects, the apparatus may additionally include an actuator or a push-button that may be configured to output a signal (e.g., a second signal) when the user activates the actuator (e.g., presses the push-button). The computing device may be further configured to receive the second signal from the apparatus, and control the virtual gaming environment in a second manner, responsive to receiving the first and second signals together. For example, the computing device may provide superpowers to the virtual character when the computing device receives the first and second signals together. In this manner, the apparatus provides additional control options to the user, which may make the user's dining experience more entertaining.

In further aspects, the apparatus may include one or more additional input units, which may provide more control options to the user. For example, the apparatus may include an inertial measurement unit (IMU), a microphone, a companion joystick device, and/or the like, which may enable the user to provide additional signals to the computing device. The computing device may control the virtual gaming environment being displayed on the display screen in different manners, based on the signals obtained from one or more additional input units described above.

The apparatus may additionally include one or more output units, e.g., a haptic output unit, a speaker, one or more lights, a display screen, etc., which may output haptic feedback, sound and/or lights/notifications indicative of an apparatus operational state, a bite-detection from the spoon, and/or events in the virtual gaming environment.

The present disclosure discloses a dining game apparatus that makes the user's dining experience more enriching and entertaining. Further, the apparatus may inculcate good and healthy food eating habits in the user. In addition, multiple users may use their respective apparatuses simultaneously, and connect to the same computing device, thereby making a social dining experience more rewarding and enjoyable for everyone.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. FIG. 1 will be described in conjunction with FIGS. 2 and 3.

The environment 100 may include a dining game apparatus 102 (or apparatus 102) that may be used by a user 104 to consume food items and/or beverages. In the exemplary aspect depicted in FIGS. 1, 2 and 3, the apparatus 102 is shaped as a spoon; however, the present disclosure is not limited to such an aspect. In other aspects, the apparatus 102 may be shaped as a fork, a cup, a drinking vessel, a knife, or any other eating or drinking utensil, without departing from the present disclosure scope.

The apparatus 102 may be configured to make user's dining experience more enriching and entertaining, and inculcate good and healthy food eating habits in the user 104. In some aspects, the apparatus 102 may be communicatively coupled with an external computing device 106 (or computer 106), and configured to transmit signals to the computer 106 based on user's interaction with the apparatus 102. The computer 106 may be, for example, a gaming console, a laptop, a desktop computer, a smartwatch, a mobile phone, and/or any other computing device. The computer 106 may render and control a virtual gaming environment on a display screen 108 based on the signals obtained from the apparatus 102, thereby making the user's dining experience more enriching and entertaining. In an exemplary aspect, the computer 106 may control the virtual gaming environment in such a way that it motivates the user 104 to eat healthy food (and/or beverages) in a fun way, thereby inculcating healthy food eating habits in the user 104.

The apparatus 102 may include a holding unit 110 that may be configured to hold a food item or a beverage. Although the holding unit 110 is shown to be shaped as a spoon in FIGS. 1, 2 and 3, the holding unit 110 may also be a fork, a cup, a drinking vessel, a knife, or any other eating or drinking utensil, as described above. Hereinafter, the holding unit 110 is referred to as spoon 110; however, the use of such terminology should not be construed as limiting.

The apparatus 102 may further include a sensor unit (shown as sensor unit 418 in FIG. 4) that may detect when the user's mouth touches the spoon 110 (and the user 104 eats the food item placed on the spoon 110). Responsive to such detection, the sensor unit may output a signal (e.g., a first signal) that may be received by the computer 106 via a wireless network. The wireless network, as described herein, may be a communication infrastructure in which the connected devices (e.g., the apparatus 102 and the computer 106) discussed in various embodiments of this disclosure may communicate. The wireless network may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

Figure 2:
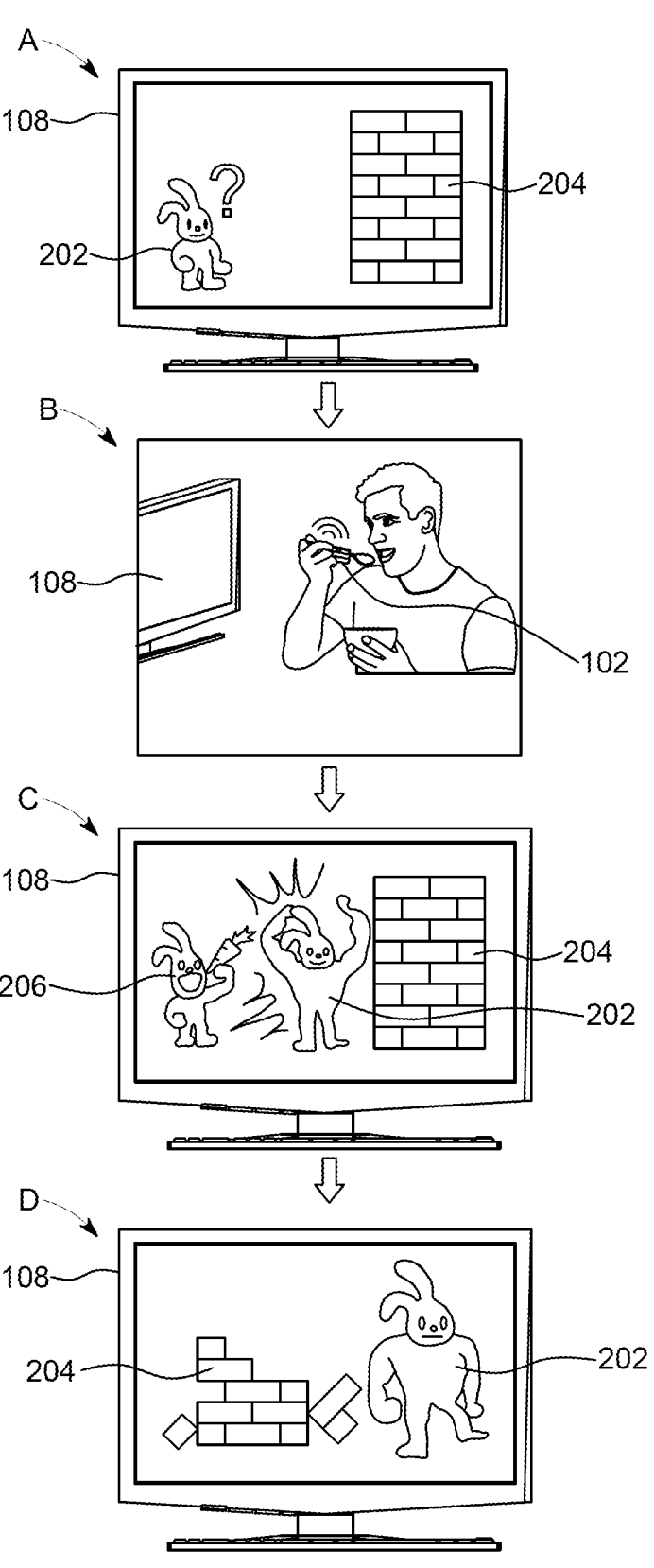
FIG. 2 depicts first example snapshots of actions performed by a computing device in accordance with the present disclosure.

In some aspects, the computer 106 may perform a first action or control the virtual gaming environment on the display screen 108 in a first manner, when the computer 106 receives the first signal from the apparatus 102. Example snapshots associated with the first action are depicted in FIG. 2. As shown in FIG. 2, in an example virtual gaming environment being displayed on the display screen 108, a character 202 (e.g., a cartoon character or a virtual character) may be faced with an obstacle 204 to overcome (as shown in a view "A" of FIG. 2), when the apparatus 102 may be communicatively coupled with the computer 106. When the user 104 eats the food from the spoon 110/apparatus 102 (as shown in a view "B" of FIG. 2), the sensor unit may transmit the first signal to the computer 106. Responsive to receiving the first signal, the computer 106 may cause the character 202 in the virtual gaming environment to grow in strength (and size), as shown in a view "C" of FIG. 2. The computer 106 may further render another character 206 in the virtual gaming environment that may imitate the user's action of eating the food, as shown in the view "C". Responsive to the character 202 gaining in strength and/or size, the character 202 may break the obstacle 204, as shown in a view "D" of FIG. 2. In this manner, the apparatus 102 and the computer 106 may entice the user 104 to eat healthy food from the spoon 110 by gamifying the user's dining experience.

The apparatus 102 may include one or more additional input means that may further enhance user's dining experience via the virtual gaming environment. For example, as shown in FIG. 1, the apparatus 102 may include an actuator 112, which may be, for example, a push-button disposed on an apparatus exterior surface. The actuator 112 may be configured to output a signal (e.g., a second signal) when the user 104 activates or presses the actuator 112. The computer 106 may be configured to receive the second signal via the wireless network, and perform a second action or control the virtual gaming environment on the display screen 108 in a second manner when the computer 106 receives the first signal and the second signal together. Stated another way, to cause the computer 106 to perform the second action, the user 104 may eat the food from the spoon 110 and press the actuator 112 simultaneously, thereby causing the apparatus 102 to transmit both the first and second signals together to the computer 106. Example snapshots associated with the second action are depicted in FIG. 3.

Figure 3:
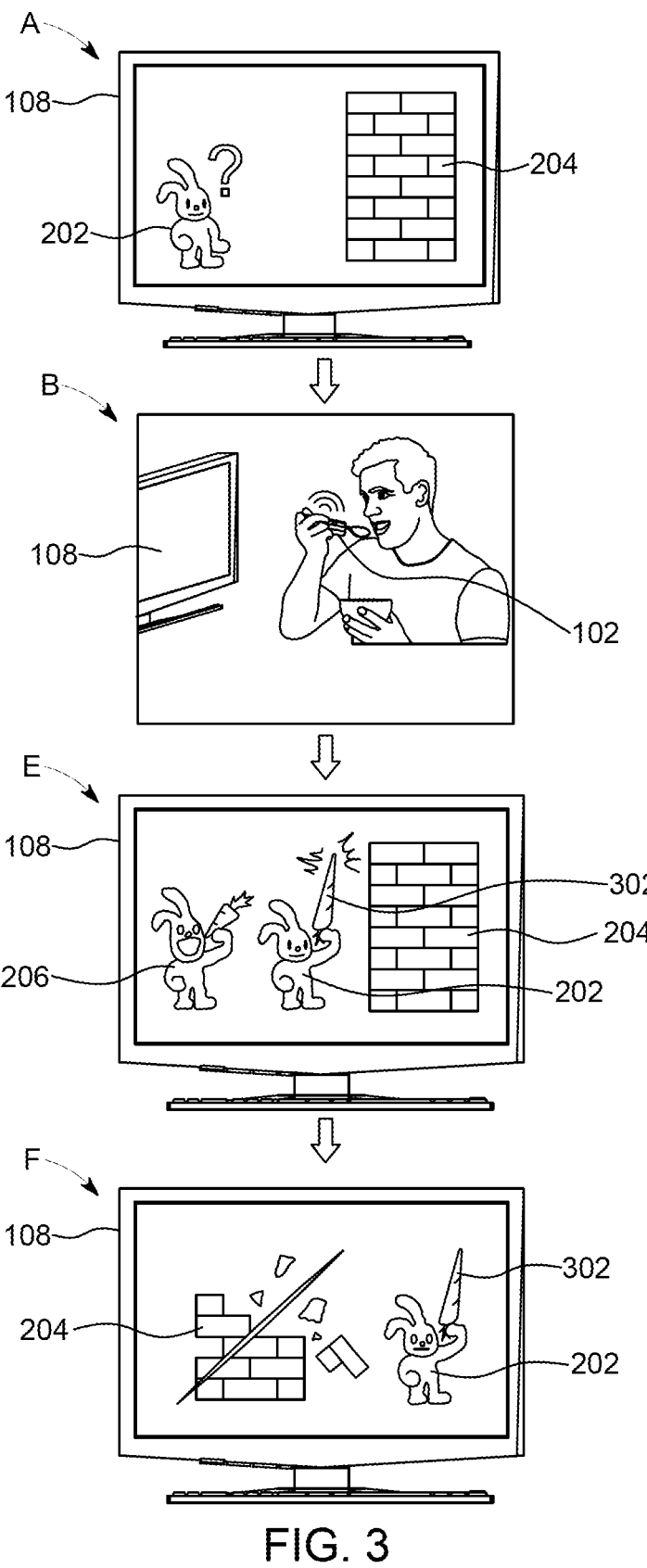
FIG. 3 depicts second example snapshots of actions performed by a computing device in accordance with the present disclosure.

As shown in a view "E" of FIG. 3, when the computer 106 receives both the first and second signals together, the character 202 may not increase in size, but may instead get superpowers (e.g., a sword 302). The character 202 may then break the obstacle 204 using the sword 302, as shown in a view "F" of FIG. 3. In this manner, the apparatus 102 provides additional entertainment and gaming environment modification options to the user 104, thereby further enhancing the user's dining experience and making the virtual gaming environment more immersive.

A person ordinarily skilled in the art may appreciate that the virtual gaming environment depicted in FIGS. 2 and 3 is exemplary in nature, and therefore, should not be construed as limiting. The virtual gaming environment may have different types of characters and/or may include a completely different game altogether (e.g., a drinking game, a racing game, a story-based adventure game, a cooperative music-making-by-dining game, etc.), without departing from the present disclosure scope.

The apparatus 102 provides the video-gaming community a way to connect to their food, and furthermore their health by inculcating healthy food habits. The apparatus 102 also provides foodies a refreshing dining experience.

Further apparatus details are described below in conjunction with the subsequent figures.

Figure 4:
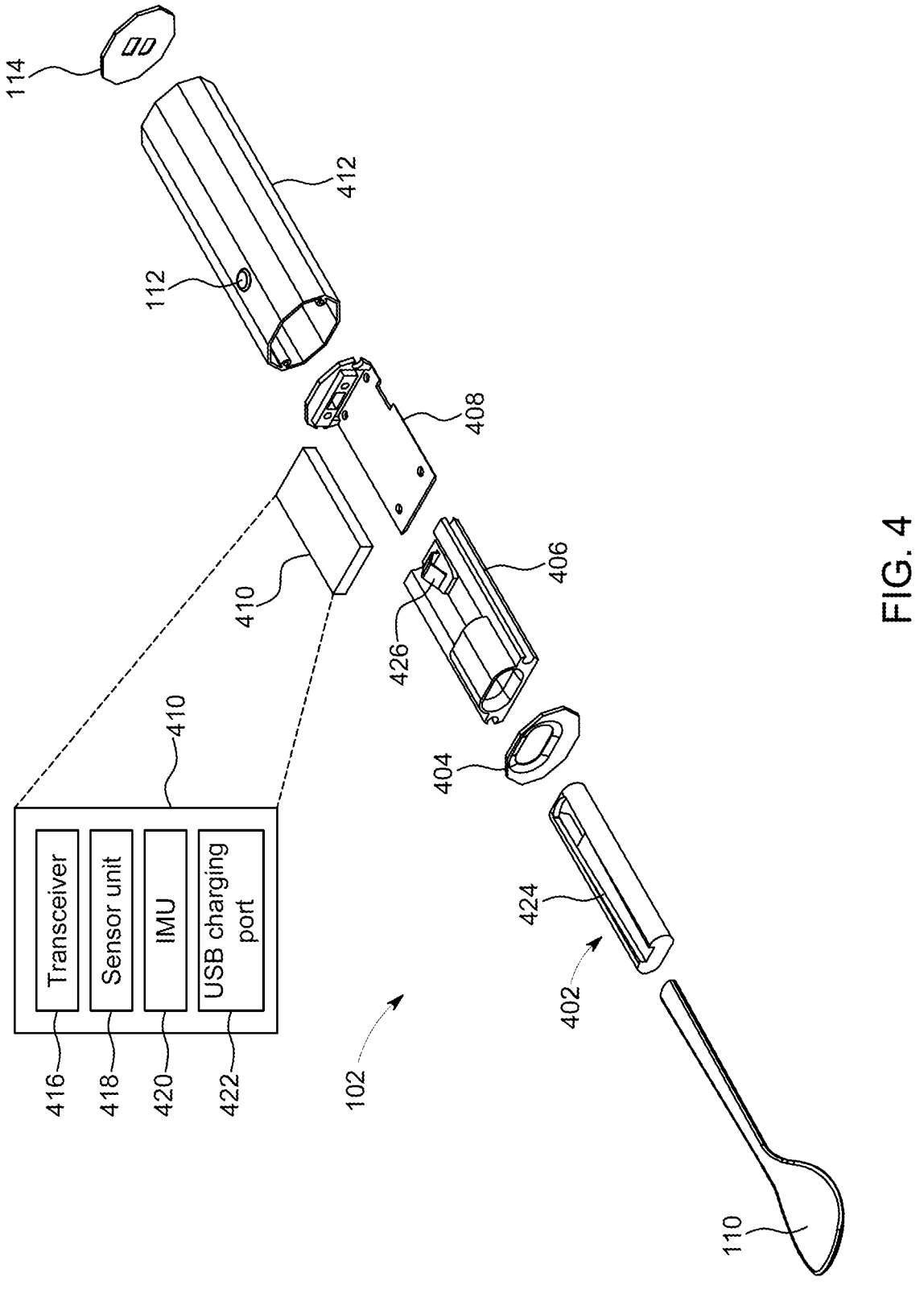
FIG. 4 depicts an exploded view of a dining game apparatus in accordance with the present disclosure.

FIG. 4 depicts an exploded view of the dining game apparatus 102 in accordance with the present disclosure. FIG. 4 will be described in conjunction with FIGS. 5 and 6.

The apparatus 102 may include a plurality of units including, but not limited to, the holding unit or spoon 110, a holding unit holster 402, a front cap 404, a holster catch 406, an electronic unit mount 408, an electronic unit 410, a housing 412, an end cap 414, and/or the like. The electronic unit 410 may include a plurality of components/modules including, but not limited to, a transceiver 416, a sensor unit 418, a gyroscope or an inertial measurement unit 420, a Universal Serial Bus (USB) charging port 422, a processor (not shown), a memory (not shown), and/or the like.

As described above in conjunction with FIG. 1, the spoon 110 may be configured to hold a food item. In some aspects, the spoon 110 may be an electrically conductive spoon (e.g., made of stainless steel or similar electrically conductive material). The holding unit holster 402 may be configured to removably secure the spoon 110. Specifically, the user 104 may slide the spoon 110 (e.g., a spoon distal portion) into the holding unit holster 402 via holster rails 424 (that may extend throughout the length of the holding unit holster 402) to secure the spoon 110 in the holding unit holster 402. Similarly, the user 104 may slide-out the spoon 110 from the holding unit holster 402 via the holster rails 424 to remove the spoon 110 from the holding unit holster 402. In some aspects, the user 104 may remove the spoon 110 from the holding unit holster 402 to clean the spoon 110, or replace the spoon 110 with a new spoon (or any other holding unit).

The holster catch 406 may be configured to receive and secure the holding unit holster 402 via the front cap 404. In some aspects, the front cap 404 may include an opening in a front cap center portion through which the holding unit holster 402 may slide onto the holster catch 406. In some aspects, the holding unit holster 402 may be removably secured on the holster catch 406.

The holster catch 406 may be configured to be attached with the electronic unit mount 408. The electronic unit mount 408 may be further configured to be attached with the electronic unit 410. All the units described above may be configured to be secured/housed in the housing 412. Specifically, the housing 412 may be configured to house the spoon distal portion (that may be inserted/slid into the holding unit holster 402), the holding unit holster 402, the holster catch 406, the electronic unit mount 408, and the electronic unit 410. In some aspects, the holding unit holster 402 may be removably slid or inserted into the housing 412, to secure the holding unit holster 402 in the housing 412. Further, the front cap 404 may cover a front portion of the housing 412 when all the components described above may be housed inside the housing 412. Similarly, the end cap 414 may cover a back/rear portion of the housing 412.

In some aspects, the actuator 112 may be disposed on a housing exterior surface, as shown in FIG. 4. In the exemplary aspect depicted in FIG. 4, the actuator 112 is shown as a push-button. As described above in conjunction with FIG. 1, the actuator 112 may output the second signal when the actuator 112 may be activated or pressed by the user 104.

In some aspects, the memory included in the electronic unit 410 may store programs in code and/or store data for performing various apparatus operations in accordance with the present disclosure. Specifically, the processor included in the electronic unit 410 may be configured and/or programmed to execute computer-executable instructions stored in the memory for performing various apparatus functions in accordance with the disclosure. Consequently, the memory may be used for storing code and/or data code and/or data for performing operations in accordance with the present disclosure.

In one or more aspects, the processor may be disposed in communication with one or more memory devices (e.g., the memory included in the electronic unit 410). The memory may include any one or a combination of volatile memory elements (e.g., dynamic random-access memory (DRAM), synchronous dynamic random access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The memory may be one example of a non-transitory computer-readable medium and may be used to store programs in code and/or to store data for performing various operations in accordance with the disclosure. The instructions in the memory may include one or more separate programs, each of which may include an ordered listing of computer-executable instructions for implementing logical functions.

The USB charging port 422 may enable the user 104 to charge an apparatus battery (not shown) that may power operation of one or more apparatus components, e.g., the transceiver 416, the sensor unit 418, the IMU 420, and/or one or more additional apparatus components described later in the description below.

The sensor unit 418 may be electrically coupled with the spoon 110 via a capacitive contact 426 (that may be disposed on the holster catch 406), e.g., when a spoon distal end touches the capacitive contact 426. In some aspects, the spoon distal end may touch the capacitive contact 426 when the spoon distal portion may be fully inserted into the holding unit holster 402, and the holding unit holster 402 may be secured on the holster catch 406.

The sensor unit 418 may include a capacitive sensor (or any other similar sensor) that may be configured to generate/output the first signal when the user mouth touches the spoon 110 (e.g., a spoon proximal portion). In some aspects, the sensor unit 418 may be an intelligent sensor unit that may differentiate between the user mouth touching the spoon 110 or a food item being placed on the spoon 110. The sensor unit 418 may generate/output the first signal only when the user mouth touches the spoon 110, and not when the food item may be placed on the spoon 110. In some aspects, the processor included in the electronic unit 410 may control operation of the sensor unit 418, so that the sensor unit 418 may output the first signal only when the user mouth touches the spoon 110.

The transceiver 416 may be communicatively and/or electrically coupled with one or more apparatus units including, but not limited to, the sensor unit 418, the IMU 420, the actuator 112, and/or one or more additional apparatus components described later in the description below. The transceiver 416 may be configured to obtain the first signal from the sensor unit 418, the second signal from the actuator 112, inputs from the IMU 420, and/or other apparatus components. The transceiver 416 may be further configured to transmit/receive signals/input/data to/from external systems (e.g., the computer 106) via the wireless network described above in conjunction with FIG. 1. For example, the transceiver 416 may transmit the first signal (obtained from the sensor unit 418) to the computer 106 when the user mouth touches the spoon 110. Further, the transceiver 416 may transmit both the first signal and the second signal (obtained from the actuator 112) when the user mouth touches the spoon 110 and the user 104 simultaneously presses/activates the actuator 112. As described above in conjunction with FIGS. 1-3, the first signal alone may cause the computer 106 to perform the first action (or control the virtual gaming environment on the display screen 108 in a first manner), and the first signal and the second signal together may cause the computer 106 to perform the second action (or control the virtual gaming environment on the display screen 108 in a second manner). Examples of the first action and the second action are described above in conjunction with FIG. 2 and FIG. 3, respectively.

Although FIG. 4 depicts an aspect where the actuator 112 is a push-button (which may be activated/pressed by the user 104 to cause generation of the second signal), the present disclosure is not limited to the aspect of the actuator 112 being a push-button. For example, as shown in a view 502 of FIG. 5, in some aspects, the actuator 112 may be a finger-controlled joypad. Further, as shown in a view 504 of FIG. 5, in other aspects, the actuator 112 may be a joystick. When the actuator 112 may be the joypad or the joystick, the user 104 may perform further actions on the actuator 112 (as opposed to only pressing the actuator 112, when the actuator 112 is a push-button), which may cause the actuator 112 to output additional/different signals (thereby causing the computer 106 to perform additional/different actions associated with the virtual gaming environment). For example, the user 104 may tilt the joystick to the left to indicate a left-bite of the food, tilt the joystick to the right to indicate a right-bite of the food, and so on. Each of such user actions may cause the computer 106 to control the virtual gaming environment in different manners (e.g., provide different superpowers to the character 202), thereby further enhancing user's dining experience and making the process of food consumption more entertaining.

The apparatus 102 may further include one or more additional input units/means (in addition to the actuator 112) through which the user 104 may perform further actions on the apparatus 102, and thereby cause the computer 106 to control the virtual gaming environment in different manners. For example, the apparatus 102 may include a companion joystick device 506, as shown in a view 508 of FIG. 5, which may be communicatively coupled with the transceiver 416. The companion joystick device 506 may be held by the user 104 in the other hand (i.e., the hand not holding the spoon 110 or the housing 412), and may be similar to the finger-controlled joypad or the joystick described above. The user 104 may tilt the companion joystick device 506 and/or perform other actions on the companion joystick device 506, to cause the computer 106 to control the virtual gaming environment in different manners.

Figure 5:
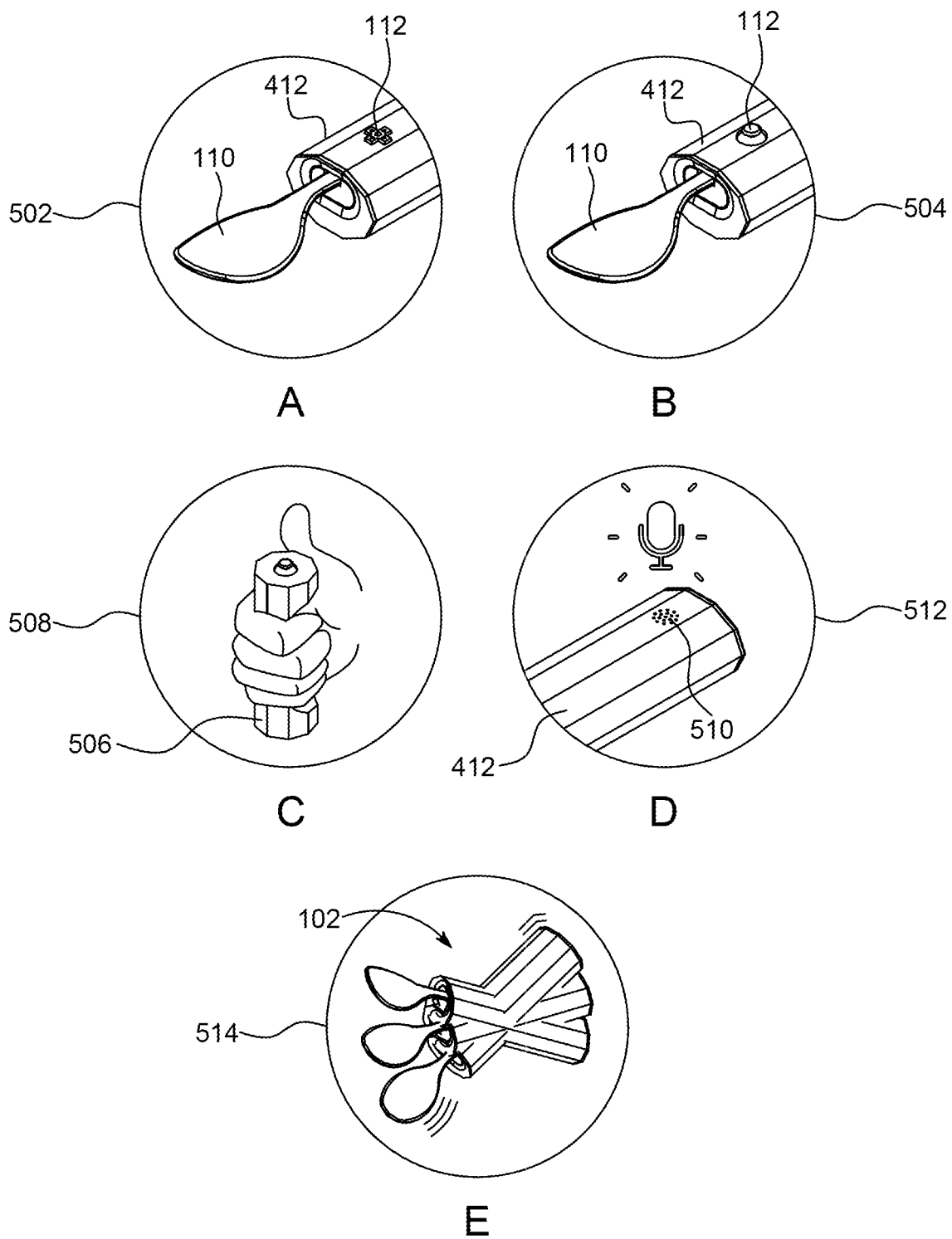
FIG. 5 depicts example snapshots of a plurality of input units associated with a dining game apparatus in accordance with the present disclosure.

In further aspects, the apparatus 102 may include a microphone 510, as shown in a view 512 of FIG. 5, which may be disposed in the housing 412 (and/or in the electronic unit 410). The microphone 510 may be configured to receive a user audio input, and transmit the user audio input to the transceiver 416. The transceiver 416 may then transmit the user audio input to the computer 106 via the wireless network. The user audio input may cause the computer 106 to perform another action (e.g., a third action) associated with the virtual gaming environment. For example, the computer 106 may manipulate the gaming audio for artistic effect, based on the user audio input.

The transceiver 416 may be further configured to obtain inputs from the IMU 420 when, e.g., the user 104 may shake the apparatus 102 (as shown in a view 514 of FIG. 5) and/or perform other actions involving an apparatus movement. In some aspects, the IMU 420 may be configured to detect the apparatus movement (e.g., an apparatus shaking movement), and transmit inputs associated with the detected apparatus movement to the transceiver 416. The transceiver 416 may further transmit the inputs obtained from the IMU 420 to the computer 106 via the wireless network. In some aspects, the inputs obtained from the IMU 420 may cause the computer 106 to perform another action (e.g., a fourth action) associated with the virtual gaming environment. For example, the computer 106 may cause the character 202 to dance or gain a new superpower, responsive to obtaining the inputs from the IMU 420.

In addition to the plurality of input units/means described above and shown in FIG. 5, the apparatus 102 may include a plurality of output units/means that output signals, feedback, etc., via the apparatus 102. For example, the apparatus 102 may include a haptic output unit (not shown) that may be part of the electronic unit 410 and/or housed in the housing 412, which may be configured to output a haptic feedback (as shown in a view 602 of FIG. 6) based on the first signal, the second signal, inputs obtained from the computer 106 (via the transceiver 416 and the wireless network), and/or signals output from one or more inputs units described above. In some aspects, the haptic output unit may trigger the haptic feedback based on bite-detection (e.g., when the sensor unit 418 detects that the user 104 may be eating food from the spoon 110) and/or in-game events associated with the virtual gaming environment being displayed on the display screen 108.

In further aspects, the apparatus 102 may include a speaker 604 that may be housed in the housing 412 (and/or be a part of the electronic unit 410), which may be configured to output sound/music (as shown in a view 606 of FIG. 6) based on the first signal, the second signal, inputs obtained from the computer 106 (via the transceiver 416 and the wireless network), and/or signals output from one or more inputs units described above. In some aspects, the speaker 604 may output sound effects, music, and/or instructions in response to bite detection or in-game events.

Figure 6:
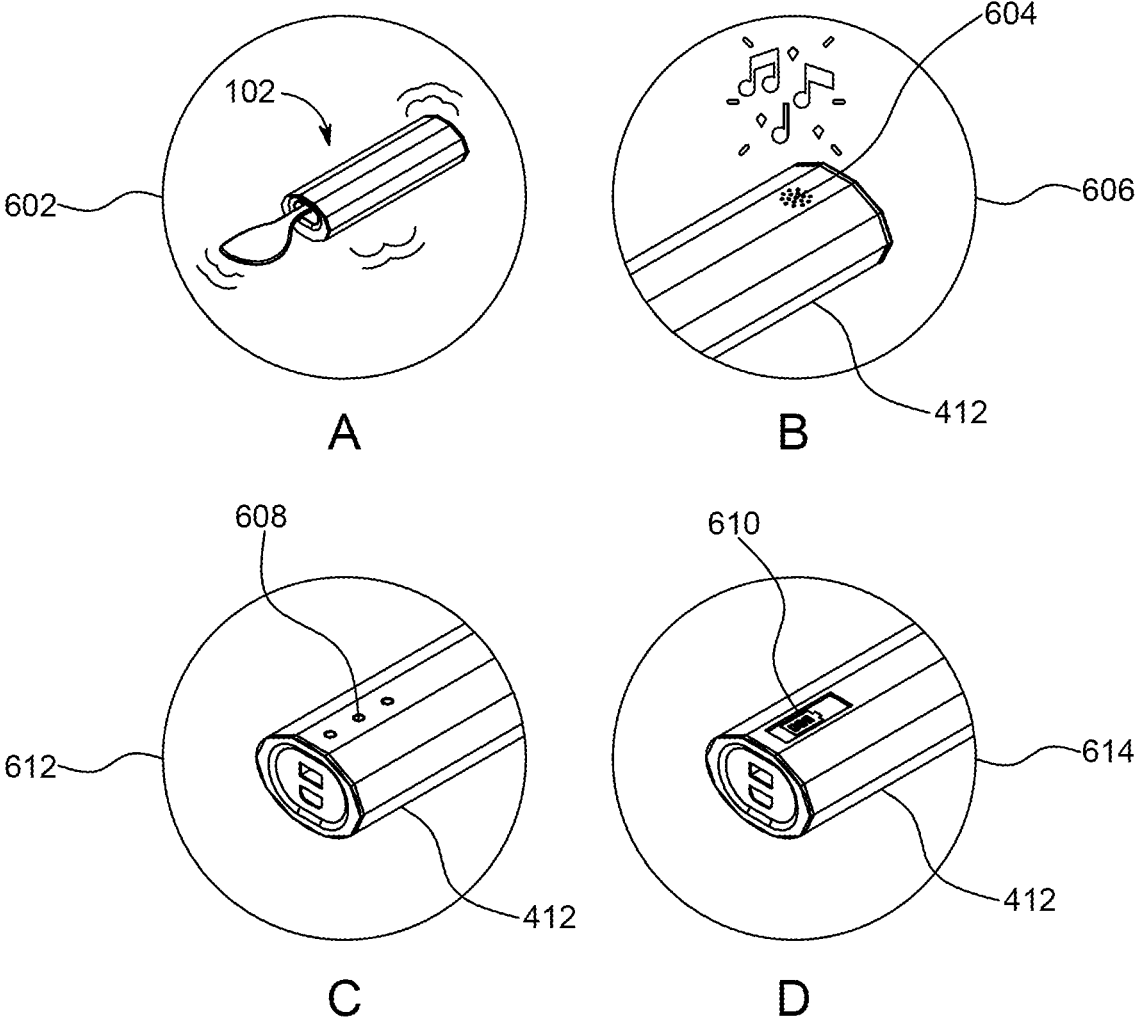
FIG. 6 depicts example snapshots of a plurality of output units associated with a dining game apparatus in accordance with the present disclosure.

In additional aspects, the apparatus 102 may include a lighting unit 608 (e.g., one or more light emitting diodes (LEDs)) and/or a digital screen 610 that may be disposed on the housing 412, as shown in views 612 and 614 of FIG. 6, respectively. The lighting unit 608 may be configured to output light indicative of one or more apparatus operational parameters (e.g., whether the apparatus 102 is switched ON or OFF, charging status of the apparatus battery, connection status associated with the apparatus 102 and the computer 106, etc.). Similarly, the digital screen 610 may be configured to display information indicative of the apparatus operational parameters.

Figure 7:
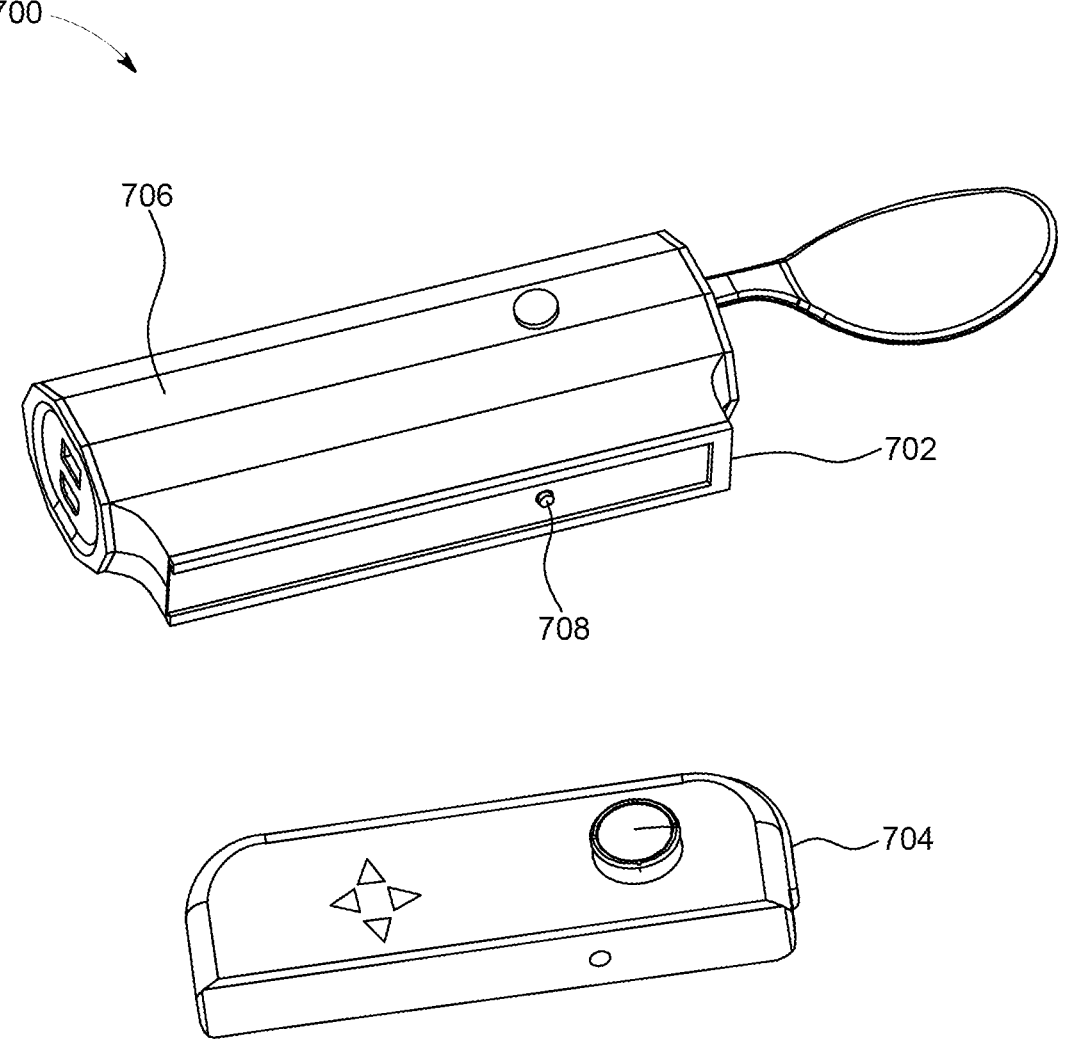
FIG. 7 depicts an example view of a dining game apparatus with an attachment unit and an external controller in accordance with the present disclosure.

FIG. 7 depicts an example view of a dining game apparatus 700 (or apparatus 700) with an attachment unit 702 and an external controller 704 in accordance with the present disclosure. The apparatus 700 may be similar to the apparatus 102 described above; however, a housing 706 (similar to the housing 412) associated with the apparatus 700 may include the attachment unit 702 that may extend through an entire length of the housing 706, as shown in FIG. 7. In other aspects (not shown), the attachment unit 702 may be disposed on a portion of the housing length (and not extend through the entire housing length). In some aspects, the shape and dimensions of the attachment unit 702 may correspond to the shape and dimensions of the external controller 704.

The attachment unit 702 may enable attachment between the housing 706 (or the apparatus 700) and the external controller 704. Specifically, the user 104 may slide and/or insert the external controller 704 into the attachment unit 702, to secure attachment between the housing 706 and the external controller 704 (e.g., mechanically snap-fit the attachment unit 702 and the housing 706). In some aspects, the external controller 704 may electrically and/or communicatively couple with the apparatus 700 via an electric connector 708, when the external controller 704 may be attached with the housing 706 via the attachment unit 702. The electric connector 708 may be, for example, a button pusher with a small motor or solenoid.

The external controller 704 may be communicatively coupled (e.g., wirelessly connected) with the computer 106, and configured to transmit signals/inputs between the apparatus 700 and the computer 106. Specifically, the external controller 704 may act as an interface between the apparatus 700 and the computer 106. In this case, in an exemplary aspect, one or more input units/means associated with the apparatus 102, as described above, may be removed from the apparatus 700, as the functions associated with the input units/means may be performed by one or more buttons/actuators that may be disposed on the external controller 704. In some aspects, the external controller 704 may be a peripheral controller associated with the computer 106 (e.g., a controller associated with a gaming console).

The shape of the external controller 704 depicted in FIG. 7 is for illustrative purpose only, and should not be construed as limiting. Further, remaining components of the apparatus 700 may be same as the components of the apparatus 102, and hence are not described again here for the sake of simplicity and conciseness.

Although the description above describes an aspect where the user 104 uses the apparatus 102 or 700 in a home environment, the apparatus 102, 700 may be used in public sectors and/or other industries including the restaurant industry, advertising industry, medical industry, scientific industry, television industry, education, and government.

Figure 8:
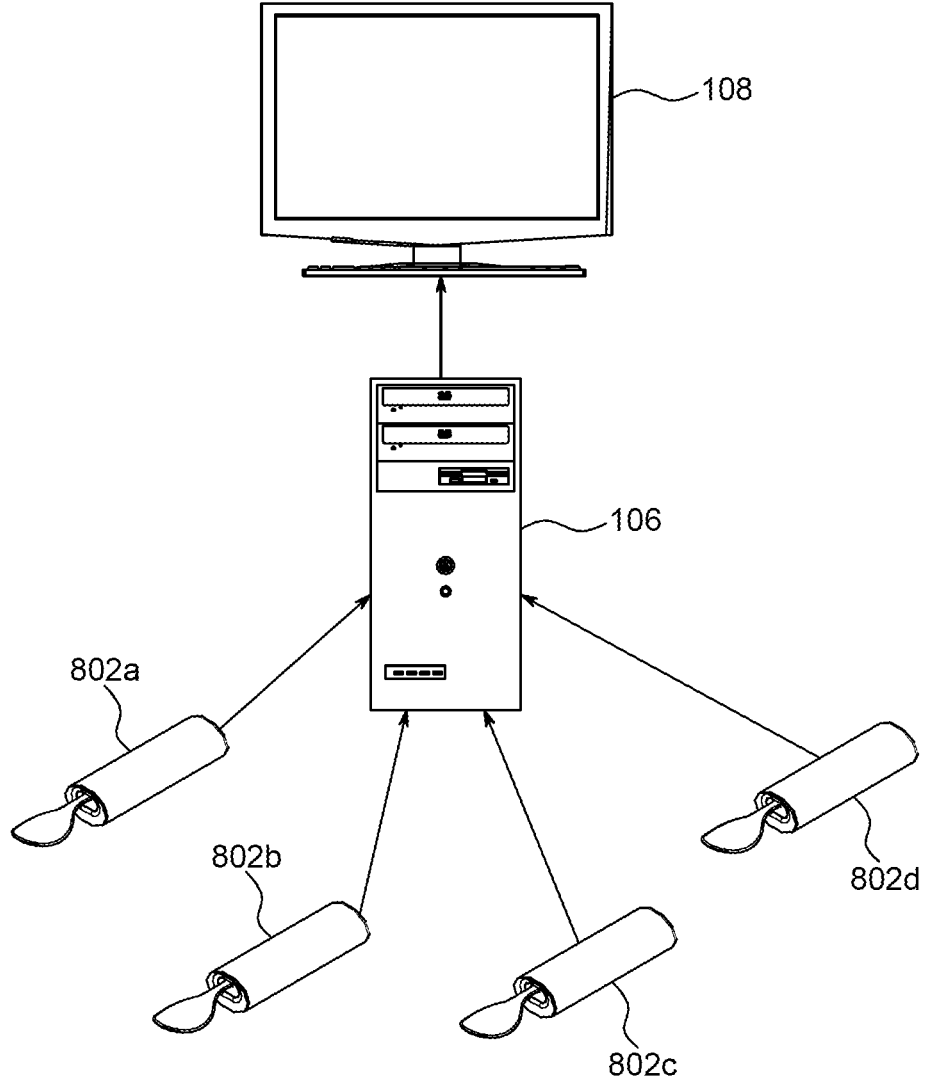
FIG. 8 depicts an example view of a plurality of dining game apparatuses connected with a computing device in accordance with the present disclosure.

FIG. 8 depicts an example view of a plurality of dining game apparatuses 802a, 802b, 802c, 802d (collectively referred to as apparatuses 802) connected with the computer 106 in accordance with the present disclosure.

Although the description above describes an aspect where a single apparatus (e.g., the apparatus 102) is connected to the computer 106 enabling a single user (e.g., the user 104) to enjoy the immersive dining experience via the apparatus 102 and the computer 106, the present disclosure is not limited to such an aspect. In the exemplary aspect depicted in FIG. 8, multiple users may use their respective apparatuses 802 to enjoy the virtual gaming environment being displayed on the display screen 108. In this case, multiple users may each use their own apparatus 802, all paired to a single computer 106 or a gaming system to enjoy and control the virtual gaming environment being displayed on the display screen 108, whilst dining. Such an arrangement may facilitate users to enjoy their meals when the users may be having food with their friends, family, etc.

Figure 9:
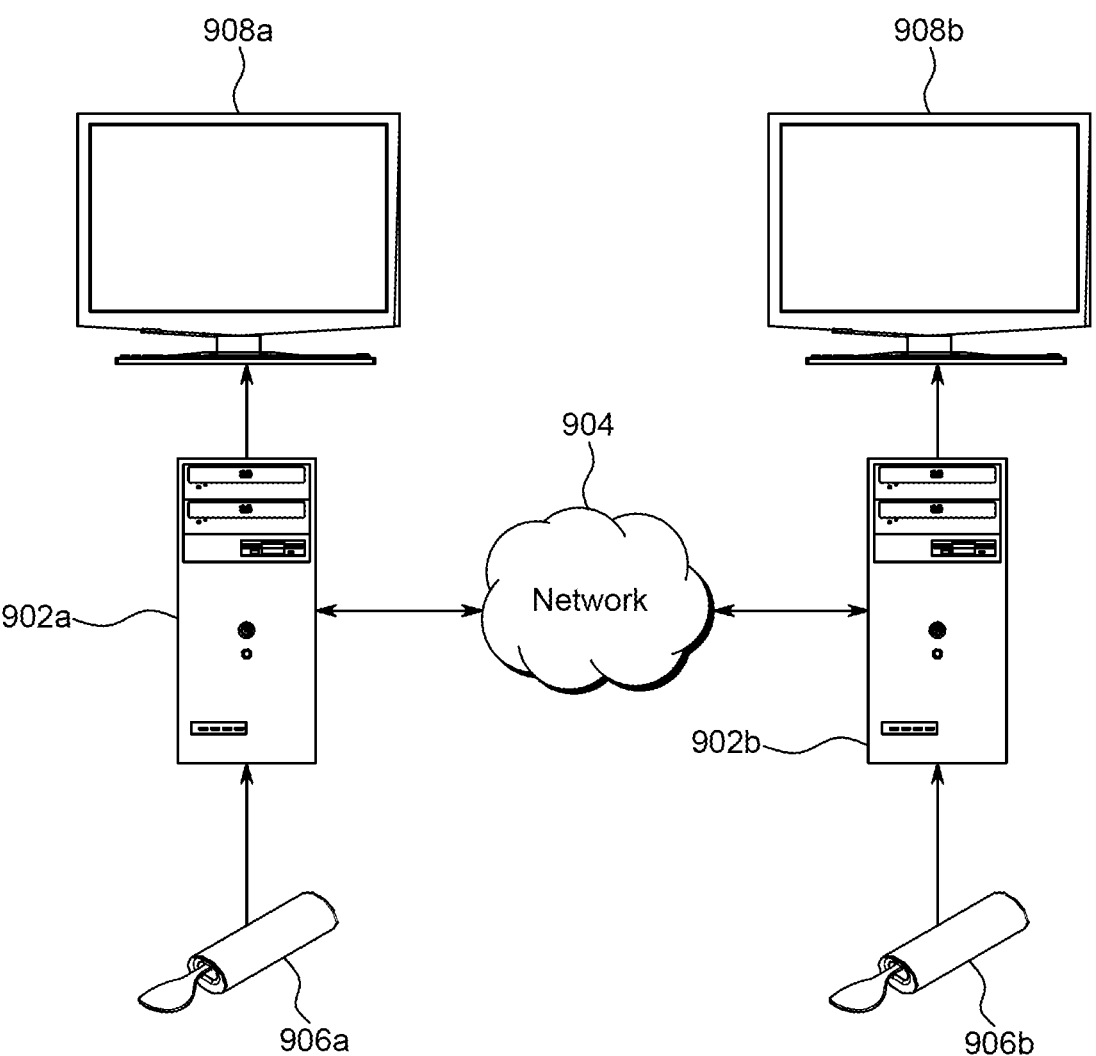
FIG. 9 depicts an example view of a plurality of computing devices connected via a network in accordance with the present disclosure.

FIG. 9 depicts an example view of a plurality of computing devices 902a, 902b (collectively referred to as computers 902) connected via a network 904 in accordance with the present disclosure. FIG. 9 specifically shows an aspect where two (or more) users may their own apparatuses (e.g., an apparatus 906a and an apparatus 906b), each paired to their respective computers 902a, 902b, to play and enjoy the virtual gaming environment on their respective display screens 908a, 908b whilst dining, via the network 904 (e.g., the Internet). In this manner, the users stationed remotely or separate from each other may use their respective apparatuses 906a, 906b to enjoy the virtual gaming environment together, while having their meals.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A dining game apparatus comprising:
a holding unit configured to hold a food item or a beverage;
a sensor unit electrically coupled with the holding unit, wherein the sensor unit is configured to output a first signal when a user mouth touches the holding unit;
an actuator configured to output a second signal when the actuator is activated; and
a transceiver communicatively coupled with the sensor unit and the actuator, wherein the transceiver is configured to transmit one or both of the first signal and the second signal to an external computing device, wherein the first signal alone causes the external computing device to perform a first action, and wherein the first signal and the second signal together cause the external computing device to perform a second action.

2. The dining game apparatus of claim 1, wherein the holding unit is a cup or a drinking vessel.

3. The dining game apparatus of claim 1, wherein the holding unit is a spoon or a fork.

4. The dining game apparatus of claim 3 further comprising a housing configured to house a holding unit distal portion, the sensor unit and the transceiver.

5. The dining game apparatus of claim 4, wherein the housing comprises an attachment unit configured to enable attachment between the housing and an external controller, and wherein the external controller is configured to be communicatively coupled with the external computing device.

6. The dining game apparatus of claim 5, wherein the dining game apparatus is configured to electrically or communicatively couple with the external controller when the external controller is attached with the housing via the attachment unit.

7. The dining game apparatus of claim 4, wherein the actuator is disposed on a housing exterior surface.

8. The dining game apparatus of claim 4 further comprising a holding unit holster configured to removably secure the holding unit, wherein the holding unit holster is configured to be inserted into the housing.

9. The dining game apparatus of claim 1, wherein the actuator is at least one of a push button, a finger-controlled joypad, or a joystick.

10. The dining game apparatus of claim 1, wherein the sensor unit comprises a capacitive sensor.

11. The dining game apparatus of claim 1 further comprising a microphone configured to receive a user audio input, wherein the transceiver is configured to transmit the user audio input to the external computing device, and wherein the user audio input causes the external computing device to perform a third action.

12. The dining game apparatus of claim 1 further comprising an inertial measurement unit (IMU) configured to detect an apparatus physical movement, wherein the transceiver is configured to transmit inputs obtained from the IMU to the external computing device, and wherein the inputs cause the external computing device to perform a fourth action.

13. The dining game apparatus of claim 1 further comprising a haptics output unit configured to output a haptic feedback based on at least one of the first signal, the second signal or inputs obtained from the external computing device.

14. The dining game apparatus of claim 1 further comprising a speaker configured to output sound based on at least one of the first signal, the second signal or inputs obtained from the external computing device.

15. The dining game apparatus of claim 1 further comprising a lighting unit configured to output light indicative of one or more apparatus operational parameters.

16. The dining game apparatus of claim 1 further comprising a Universal Serial Bus (USB) charging port configured to enable charging of the dining game apparatus.

17. A dining game apparatus comprising:
a spoon configured to hold a food item;
a sensor unit electrically coupled with the spoon, wherein the sensor unit is configured to output a first signal when a user mouth touches the spoon;
an actuator configured to output a second signal when the actuator is activated;
a transceiver communicatively coupled with the sensor unit and the actuator, wherein the transceiver is configured to transmit one or both of the first signal and the second signal to an external computing device, wherein the first signal alone causes the external computing device to perform a first action, and wherein the first signal and the second signal together cause the external computing device to perform a second action; and
a housing configured to house a spoon distal portion, the sensor unit and the transceiver.

18. The dining game apparatus of claim 17, wherein the actuator is at least one of a push button, a finger-controlled joypad, or a joystick.

19. The dining game apparatus of claim 17, wherein the sensor unit comprises a capacitive sensor.

20. A dining game apparatus comprising:
a spoon configured to hold a food item;
a sensor unit electrically coupled with the spoon, wherein the sensor unit is configured to output a first signal when a user mouth touches the spoon;
an actuator configured to output a second signal when the actuator is activated;
a transceiver communicatively coupled with the sensor unit and the actuator, wherein the transceiver is configured to transmit one or both of the first signal and the second signal to an external computing device, wherein the first signal alone causes the external computing device to perform a first action, and wherein the first signal and the second signal together cause the external computing device to perform a second action; and a housing configured to house a spoon distal portion, the sensor unit and the transceiver, wherein the housing comprises an attachment unit configured to enable attachment between the housing and an external controller, wherein the external controller is configured to be communicatively coupled with the external computing device, and the dining game apparatus is configured to electrically or communicatively couple with the external controller when the external controller is attached with the housing via the attachment unit.

* * * * *